United States Patent [19]

Edwards et al.

[11] Patent Number: 5,742,823
[45] Date of Patent: Apr. 21, 1998

[54] TOTAL OBJECT PROCESSING SYSTEM AND METHOD WITH ASSEMBLY LINE FEATURES AND CERTIFICATION OF RESULTS

[75] Inventors: Nathen P. Edwards, 54 Holly La., Darien, Conn. 06820; Estol C. Lamb, 3333 Linda Ct., Rock Hill, S.C. 29732; Campbell L. Stubbs, 145 W. Woods Rd., Hamden, Conn. 06517

[73] Assignees: Nathen P. Edwards, Darien, Conn.; Estol C. Lamb, Rock Hill, S.C.; Campbell L. Stubbs, Hamden, Conn.

[21] Appl. No.: 587,586

[22] Filed: Jan. 17, 1996

[51] Int. Cl.$^6$ .................................................. G06F 9/00
[52] U.S. Cl. .................... 395/672; 395/670; 395/706; 364/232.22; 364/243; 364/243.4
[58] Field of Search .................. 395/670, 701, 395/672, 705; 364/232.22, 243.4, 243

[56] References Cited

U.S. PATENT DOCUMENTS

| | | | |
|---|---|---|---|
| 4,885,684 | 12/1989 | Austin et al. | 364/300 |
| 4,953,083 | 8/1990 | Takata et al. | 364/200 |
| 5,204,965 | 4/1993 | Guthery et al. | |
| 5,237,673 | 8/1993 | Orbits et al. | |
| 5,313,594 | 5/1994 | Wakerly | |
| 5,313,649 | 5/1994 | Hsu et al. | |
| 5,317,757 | 5/1994 | Medicke et al. | |
| 5,339,430 | 8/1994 | Lundin et al. | |
| 5,347,639 | 9/1994 | Rechtschaffen et al. | |
| 5,386,517 | 1/1995 | Sheth et al. | |
| 5,388,242 | 2/1995 | Jewett | |
| 5,423,040 | 6/1995 | Epstein et al. | 395/650 |

OTHER PUBLICATIONS

Research Report, entitled Engineered Software, By Nathen P. Edwards and E. Charles Lamb, IBM Research Division, dated Apr. 12, 1989, pp. 1–23.

Article, entitled A Look at Characterizing the Design of Information Systems, By Nathan P. Edwards, IBM Research Center, dated Nov., 1974, pp. 612–621.

Article, entitled Multicomputers: Message–Passing Concurrent Computers, By W.C. Athas et al., Dated Aug., 1988, pp. 9–23, Reader Service No. 3 (1 sheet); Article entitled Cellular Array Processor, By ITT Advanced Technology Center, pp. 1–9.

Research Report, entitled Busses for Message Passing Multiprocessors, By IBM Research Division, RC 15736 (#69918) Dated, May 2, 1990, pp. 1–22.

Research Report, entitled Configurable Pipelined Application, By IBM Research Division, RC 7313 (#31451) Dated Sep. 19, 1978, pp. 1–13.

Primary Examiner—Lucien U. Toplu
Assistant Examiner—Majid A. Banankhah
Attorney, Agent, or Firm—Bachman & LaPointe, P.C.

[57] ABSTRACT

In accordance with the invention, a processing system and method are provided which use assembly line procedures and substantially fixed or limited function process elements, as well as total object treatment of all data and elements of the system, so as to provide a system which produces certifiably correct results. All objects have specifications and account entries and are managed by specification identification and by date-time or instance identification for a single member of a particular specification class. All data carry this information as "co-values." According to another aspect of the invention, a processor system and process structure are configured to execute a particular job or process specified in a process network structure or directed graph, and the process continues according to the invention as a direct flow of data between processor elements, without interruption or intervention by control elements, until job completion or the occurrence of some error condition.

41 Claims, 6 Drawing Sheets

TOTAL OBJECT PROCESSING SYSTEM AND METHOD WITH ASSEMBLY LINE FEATURES AND CERTIFICATION OF RESULTS

BACKGROUND OF THE INVENTION

The invention relates to a processor system and, more specifically, to a method and apparatus for executing application processes and for preparing application processes.

Countless disclosures and patents exist directed to variations of the computer hardware/software field which attempt to deal with various problems including speeding the operation of computers, providing enhanced use of available memory, providing some degree of security with respect to computer stored data and computer performed functions, and the like.

Conventional programing wisdom dictates that both computation and data storage resources are to be conserved. To a large extent, the quality of a particular program or application is conventionally measured by how cleverly the programmer has minimized the use of hardware resources to produce a result. An extensive array of strategies based upon this objective have been developed over the years. However, numerous problems persist in the art.

For example, because hardware is frequently used intermittently by data storage and one or more software functions in rapid succession, it is virtually impossible to monitor the operation of any even mildly complex function and to thereby ensure that the results of such function are free of tampering, human or program error or machine malfunction. This problem is particularly important with respect to financial information and transactions which are almost universally stored using computers. It is generally agreed or at least suspected that there are annual losses of billions of dollars through computer crime.

Also, in order to try to make better use of ever more powerful computer hardware, and to support the ability of the computer industry to expand, computer software (such as operating systems, assemblers, compilers, interpreters, utility routines, language counterparts, application programs and the like) has become ever more complex, and can include many hundreds of thousands of lines of code. This leads to software which remains unreliable, uses hardware resources inefficiently, and which cannot be verified as to accuracy of results.

It is apparent that despite numerous efforts to date, the need exists for a processor system which is efficient, reliable, secure and certifiable as to results produced.

It is therefore the primary object of the present invention to provide a processor system which enhances efficiency of processing and information storage.

It is another object of the invention to provide a processor system which is certifiably secure against tampering.

It is a further object of the present invention to provide a processor system which provides certifiably correct results.

It is a still further object of the present invention to provide a processor system which is embodied in modular electronics of simple form resulting in low cost and a large reduction in manufacturing defects.

It is another object of the present invention to provide a processor system which is efficient in the use and allocation of hardware.

It is still another object of the present invention to provide a processor system which can continue to operate upon the failure of a particular modular element.

It is also an object of the present invention to provide a processor system wherein operating systems are replaced by hardware functions.

It is yet another object of the present invention to provide a method for executing application processes wherein the foregoing objects and advantages are attained.

Still further objects and advantages will appear hereinbelow.

SUMMARY OF THE INVENTION

In accordance with the present invention, the foregoing objects and advantages are readily attained.

In accordance with the invention, a processing system and method are provided which use assembly line procedures and substantially fixed or limited function process elements, as well as total object treatment of all data and elements of the system, so as to provide a system which produces certifiably correct results. All objects have specifications and account entries and are managed by specification identification and by date-time or other means of instantiating a single member of a particular specification class. All data carry this information as "co-values."

Once a system is configured to execute a particular job or process specified in a process network structure or directed graph, the process continues according to the invention as a direct flow of data between processor elements, without interruption or intervention by control, until job completion or the occurrence of some error condition.

According to the invention, a processor system for executing processes is disclosed which comprises a plurality of discrete processing elements; information storage means for storing data; means for generating queues for delivering and receiving data; control means for controlling execution of said process and for managing said plurality of discrete processing elements; and means for communicating said plurality of discrete processing elements, said information storage means, said means for generating queues, and said control means; wherein said control means comprises: i) application setup means for analyzing said process and separating said process into a number of process functions, and for assigning said number of process functions to a number of discrete processing elements of said plurality of discrete processing elements; and ii) data queue analyzing means for extracting data input and data output requirements from said process and signalling said means for generating queues to generate queues to deliver said data input requirements and to receive said data output requirements.

The processor system according to the invention may preferably further include means for detecting an inoperative processing element, and for automatically replacing said failed processing element, preferably without an interruption in execution of said process.

In further accordance with the invention, a method for executing an application process comprises the steps of analyzing said process so as to identify process functions, data input requirements and data output requirements of said process; assigning said process functions to a plurality of discrete processing elements for generating said data output requirements from said process functions and said data input requirements; and generating queues containing said data input requirements to deliver copies of said data input requirements to said plurality of discrete processing elements, and to receive copies of said data output requirements from said plurality of discrete processing elements.

In accordance with another aspect of the present invention, an application development apparatus for developing an application process to be executed by a processor system is disclosed, the application development apparatus comprising: user interface means for input of information, data input requirements, data output requirements, and process functions for said application process; a specification tool communicated with said user interface for providing said application process with a specification including said data input requirements and said data output requirements; and information storage means associated with said specification tool for receiving said application process with said specification.

The application development apparatus according to the present invention may preferably further include a logging tool for recording actions of said application development apparatus during the development of said application process.

BRIEF DESCRIPTION OF THE DRAWINGS

A detailed description of the preferred embodiments of the invention follows, with reference to the attached drawings, wherein.

DETAILED DESCRIPTION

Figure 1:
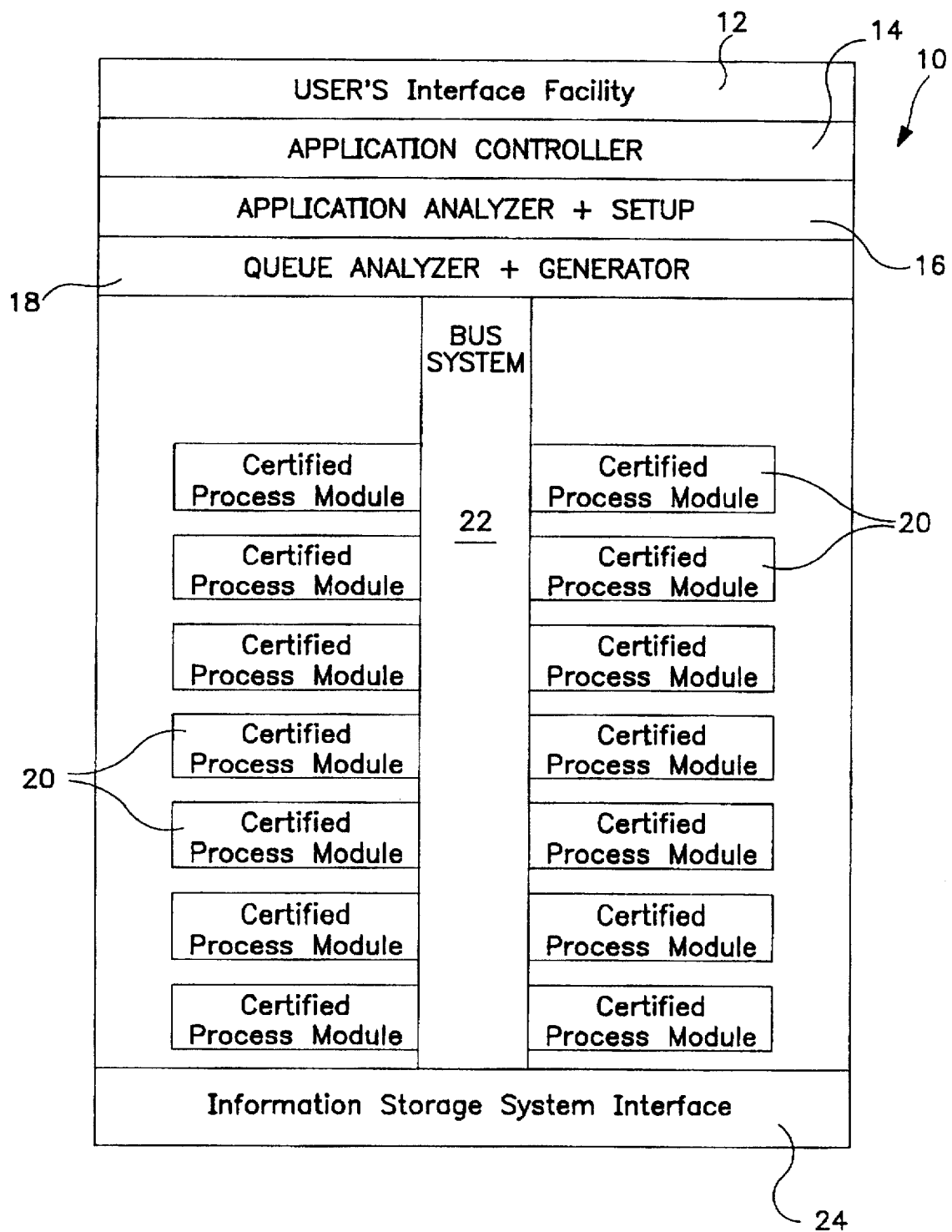
FIG. 1 is a schematic view of a processor system according to the invention.

The invention relates to a processor system and method for executing processes in an assembly line manner so as to increase efficiency of the process. Further, the processor system and method are implemented so as to provide security, reliability and accountability.

The processor system according to the invention treats information such as reports, messages, screens and control information as industrial products, and prepares or processes them in an assembly line manner. Because of the mode of operation of the present invention, it is referred to as the Assembly Line Processor System for Information, or ALPS/I. The ALPS/I system according to the present invention advantageously applies the full power of modern industrial manufacturing practices to data processing.

Referring to the drawings, an ALPS/I system according to the invention preferably includes several preferably distinct facilities including one or more processor systems 10 (FIG. 1), a systems and security control facility 50 (FIG. 2), an application development facility 100 (FIG. 3), an application test facility 150 (FIG. 4), and an information storage facility 200 (FIG. 5), each of which serves to provide the ALPS/I system according to the invention with enhanced efficiency and operation speed, greatly improved security and reliability, and affordability.

The various components of the ALPS/I system according to the invention advantageously treat all information as "true objects", meaning in other words that each piece of information is a discrete real thing, uniquely identifiable and accountable. Examples of objects include functions, procedures, process specifications, values, data specifications and the like. In accordance with the invention, objects are generally divided into three classes, namely text, specifications and values (alphabetic, numeric and alphanumeric). Within the object hierarchy, a class is a set of objects having one or more common attributes, an attribute is a characteristic ascribed to an object, and a value is the specified lowest level of an attribute.

Referring to FIG. 1, an ALPS/I processor system 10 according to the invention will be described. Processor system 10 according to the invention is the facility of the overall ALPS/I structure which is to be used by end users to perform desired functions. According to the invention, processor system 10 preferably includes a user interface facility 12, an application controller 14, an application analyzer and setup facility 16, a queue analyzer and generator facility 18, a plurality of discrete processing elements 20, and a communication bus system 22 electrically linking or communicating the system elements for communication and data transfer. An information storage system interface 24 is also preferably connected along bus 22 to interface with an information storage facility (not shown in FIG. 1), which stores data and applications to be run by a user of system 10. These applications are developed using facility 100 which will be discussed below.

Processor system 10 according to the invention operates as will be discussed below as an assembly line processor which is configured according to the invention to provide a desired function. System 10 is therefore referred to as a configurable assembly line or CAL.

According to the invention, user interface 12 may suitably be provided as any conventional interface member such as a conventional computer keyboard and the like. Interface 12 primarily serves to allow authorized users with access to system 10 to run certified applications as desired, and to enter the identification of data specifications and delimiters, time instance and other information as authorized and as required by a certified application.

Application controller 14 serves to control and manage the execution of processes on elements 20, and works in conjunction with application analyzer and setup facility 16 to analyze a process to be executed, separate the process into a plurality of process functions and specifications as will be discussed below, and assign the process functions to one or more elements 20 for execution, in accordance with the invention. Processes to be executed according to the invention preferably also include a process network structure which is read by controller 14, and controller 14 assigns elements 20 as indicated by the network structure.

Application controller 14 also works in conjunction with queue analyzer and generator facility 18 so as to analyze a process to be executed, to extract the data input requirements and data output requirements necessary for executing the particular process function, and signal facility 18 to generate data input queues and data output queues for providing information to the element or elements 20 currently executing a particular process function and for receiving data output values from elements 20 after execution. In accordance with the invention, data input requirements of a particular process function refer to the particular instance of a data specification and input data with delimiter which is to be called for by a particular process function, and data output requirements refer to the particular instance of a data specification or output data values to be output upon execution of the process function. By generating queues for delivering data input and receiving data output values prior to or synchronous with execution of a process, the processing or execution of a particular process function is greatly accelerated in accordance with the invention.

Application controller 14 is also preferably configured in accordance with the invention to detect a failed or inoperative element 20, and to substitute a new element 20 into the logical structure of a process being executed so as to continue execution of the process, preferably without significant interruption of same. This may be accomplished, for example, by monitoring elements 20 involved in the execution of a particular process to insure that all elements are receiving and shipping input data and output data values as desired. Upon the detection of a failed or inoperative processor element 20, application controller 14 preferably inserts a replacement element or elements 20 into the logical network structure of the process being executed by substituting the logical location of a replacement element from inventory for the logical location of the failed element in the network. Still further according to the invention, application controller 14 may suitably be configured to maintain an inventory of available elements 20 for assigning to new process functions, or individually to replace failed elements 20 as described previously. In this regard, application controller 14 may further be configured so as to return a failed element 20 to the available inventory, along with a notation or flag as to the function the failed element 20 was performing upon failure. In this manner, elements 20 may be reassigned to other types of functions for which they are still operative.

Application controller 14 further serves according to the invention to monitor progress of processes assigned to elements 20 for execution, and upon the completion of a process, generates an end of process code which is the last data element transmitted to the process elements assigned to that application or process. The end of process code is preferably sent to each process element assigned to that particular process. In accordance with the invention, the end of process code may be introduced after the last data queue has been emptied. In accordance with the invention, application controller 14 and elements 20 may preferably be configured so as to attach an end of process marker to the end of a data stream. When all inputs of a particular element 20 have received an end marker, that element 20 ships an end marker and signal indicating that that element 20 is ready for assignment to the next or another process.

Various components of system 10 according to the present invention, including elements 20, are provided as preconfigured individual hardware processing packages which include the desired function either directly in hardware logic, as firmware, or programming implemented under user inaccessible, ROM control. This is advantageous in that the operation of system 10 is therefore secure against tampering by end users and is therefore rendered far more secure than conventional computer or processor systems. Thus, and in accordance with the invention, application controller 14, application analyzer and setup facility 16, queue analyzer and generator facility 18, and other components of system 10 as desired are preferably implemented in manufacturer-provided and certified hardware which performs a particular step or series of steps with respect to an input process function.

Processing elements 20 according to the invention are preferably a number of individual hardware processing elements or micro-modules preferably packaged as a full wafer for assembly into a complete system. Elements 20 are modular so that, advantageously, individual elements 20 or modules can be replaced, substituted, added or moved between or within processor systems 10 with desirable versatility. Replacement or substitution of element 20 may be accomplished physically, or logically for example by application controller 14.

Elements 20 are preferably manufactured using state of the art technology, for example currently including wafer scale fabrication, CMOS technology, and sub nano-second state of the art lithography on six (6) inch or greater diameter wafers, preferably having at least 400 usable elements per wafer. Of course, numerous other configurations are suitable, especially as the state of the art advances in the field of endeavor of the present invention.

In accordance with the invention, wafers or packages of elements 20 may alternatively be provided including a standard mix of types of elements 20, or including specific and variable mixes of types of elements tailored or specified to a certain function.

Providing wafers having a standard mix of types of elements 20 results in identical wafers which, according to the invention, are readily interchangeable and assignable between tasks. The simple and uniform structure of standard wafers of elements 20 according to the invention leads to a reduction in manufacturing cost and a large reduction in manufacturing defects, thereby providing a system which is more reliable and which has system resources that are more readily replaceable or expandable.

Alternatively, providing wafers having a specified mix of elements 20 is advantageous in accordance with the invention so as to provide wafers for performing a certain function such as, for example, matrix inversion, orthogonal transforms and the like.

In further accordance with the invention, it is preferred that most and more preferably all components of system 10, especially application controller 14, application analyzer and setup facility 16, queue analyzer and generator facility 18, and processor elements 20 are each implemented in logically discrete hardware or firmware locations. This is advantageous in accordance with the present invention as processing facilities and memory areas are no longer shared by programs, data and the like which sharing rendered adequate accounting for the reliability and accuracy of a particular executed process impossible using conventional systems. Thus, in accordance with the invention, each component of system 10 is preferably implemented in a logically and most preferably physically separate and discrete manner so that no commingling of operating systems, programs and data can occur.

In accordance with a further embodiment of the invention, application analyzer and setup facility 16 is further configured or programmed to maintain an inventory of all process elements 20 available to application controller 14, the inventory including the status of each process element 20, such as "available", "assigned to an application", or "inoperative". Facility 16 is also configured or programmed, in accordance with the invention, to extract a pre-determined process network structure from a particular application process to be executed, to establish a network of elements 20 to be assigned to the execution of the process, and to provide relevant portions of the process network structure to each element 20 of the network of elements. In this manner, each element 20 is provided with the identification and logical location of other processing elements 20, especially identification and logical location of predecessor elements 20 from which data is received, and identification and logical location of successor processing elements 20 to which data values are provided, so that each processor element 20 keeps track of where data input was received from, and where data output values were forwarded to.

In accordance with the invention, accountability and reliability of information products prepared by system 10 is greatly enhanced by providing all data input with data co-values, and treating every piece of data, process function and user input as a true object, which can be identified, specified, verified to specification and accounted for independent of environment or past or present use. Thus, in accordance with the invention, all items of information which are initially stored in system 10, or which are subsequently entered, are provided with data co-values including an identifier, an authentication code and, in the preferred embodiment, a validation code.

Further, each item of information is provided with a specification including the reliability and accuracy of the particular piece of information, as well as an account, meaning, expression, representation and, preferably, allowed use of the particular piece of information. Process functions when entered via application development facility 100, which will be further described below, are implemented so as to carry forward the desired data co-values and specification from data input through process execution to data output, and system 10 according to the invention is preferably configured to ensure the presence of such data co-values and specification before such data output is allowed to enter an information storage area, thereby ensuring accountability and reliability of all information products of processor system 10.

During the development of an application, a specification is developed for the application which includes reliability and accuracy for output of the application, based upon the reliability and accuracy specifications provided with the data input for use with the application. Thus, each application will contain a specification which includes information as to the reliability and accuracy of output from that application. In this regard, the application specification may preferably in accordance with the invention include reliability ranges and accuracy ranges. In further accordance with the invention, data specifications can be carried forward through the execution of the application process so as to provide more exact figures with respect to reliability and accuracy for the data output values so generated.

Returning to FIG. 1, processing elements 20 of system 10 are preferably provided in the form of certified process modules as illustrated in FIG. 1. Each certified process module or element 20 according to the invention has a status which is signaled to application controller 14 to indicate whether a particular element is (1) assigned to an application to execute a particular process function, (2) ready to receive a process function to be executed or (3) inoperable, thereby indicating a "not ready" status for an extended period of time. Advantageously, system 10 according to the invention is configured to automatically remove an inoperable processing element, without requiring system shutdown, and to logically replace any inoperable processing element 20 within a process network structure with further processing elements 20 as needed. Thus, the failure of a particular element 20, even during execution of a process, does not significantly impair the operation of system 10.

In accordance with the invention, processor elements 20 are preferably configured so that no calls for specific data are ever issued by elements 20. Rather, the aforedescribed status is sent to application controller 14, which assigns further process functions to a particular element 20 when element 20 signals "ready". By precluding data calls directly from a processing element 20, security against viruses, bombs and other intentional or unintentional bugs is provided.

Processor elements 20 preferably include input queues or registers to receive data from communication bus 22, which data is retained at the queues or registers until the next input is received, or until the end of process or process function. Elements 20 preferably also include output queues or registers which retain data output generated by element 20 for transmission to successor processor elements. The output queues retain output values until element 20 generates new output data, or until the end of process or process function. Each element 20, upon receiving an end of process or process function at each input, clears all queues and resets conditions of element 20 to the ready status, that is, to conformance with initial state specification for receiving further instructions.

Processor elements 20 according to the invention are also preferably configured such that, when a particular element is assigned to a process function, the element sends a ready for data signal to a source of data input which may be a predecessor processing element or a queue for supplying the necessary data. The ready for data signal indicates that the sending processing element is ready to receive the next item of data. Still further according to the invention, each processing element is also preferably configured to send copies of data output to a receiver of the data output upon receiving a ready for data signal from the receiver of the data output, which may be a successor processing element or a data queue. This preferred configuration of processing elements according to the invention further facilitates the protection of the ALPS/I system according to the present invention against viruses and the like. As set forth above, each processing element preferably also includes registers or queues for storing copies of data input received by that processing element at each input port, and data output provided by that processing element. These copies are preferably retained until the processing element receives a suitable indication with respect to receipt of the data output of interest. At this point, the processing element is free to signal ready for receiving new data input as desired.

FIGS. 2–5 illustrate other components of the ALPS/I system according to the invention. It should be noted, however, that each facility, as illustrated in FIGS. 2–5, preferably includes a CAL processor system 10 preferably substantially similar or identical to CAL processor system 10 illustrated in FIG. 1.

Figure 2:
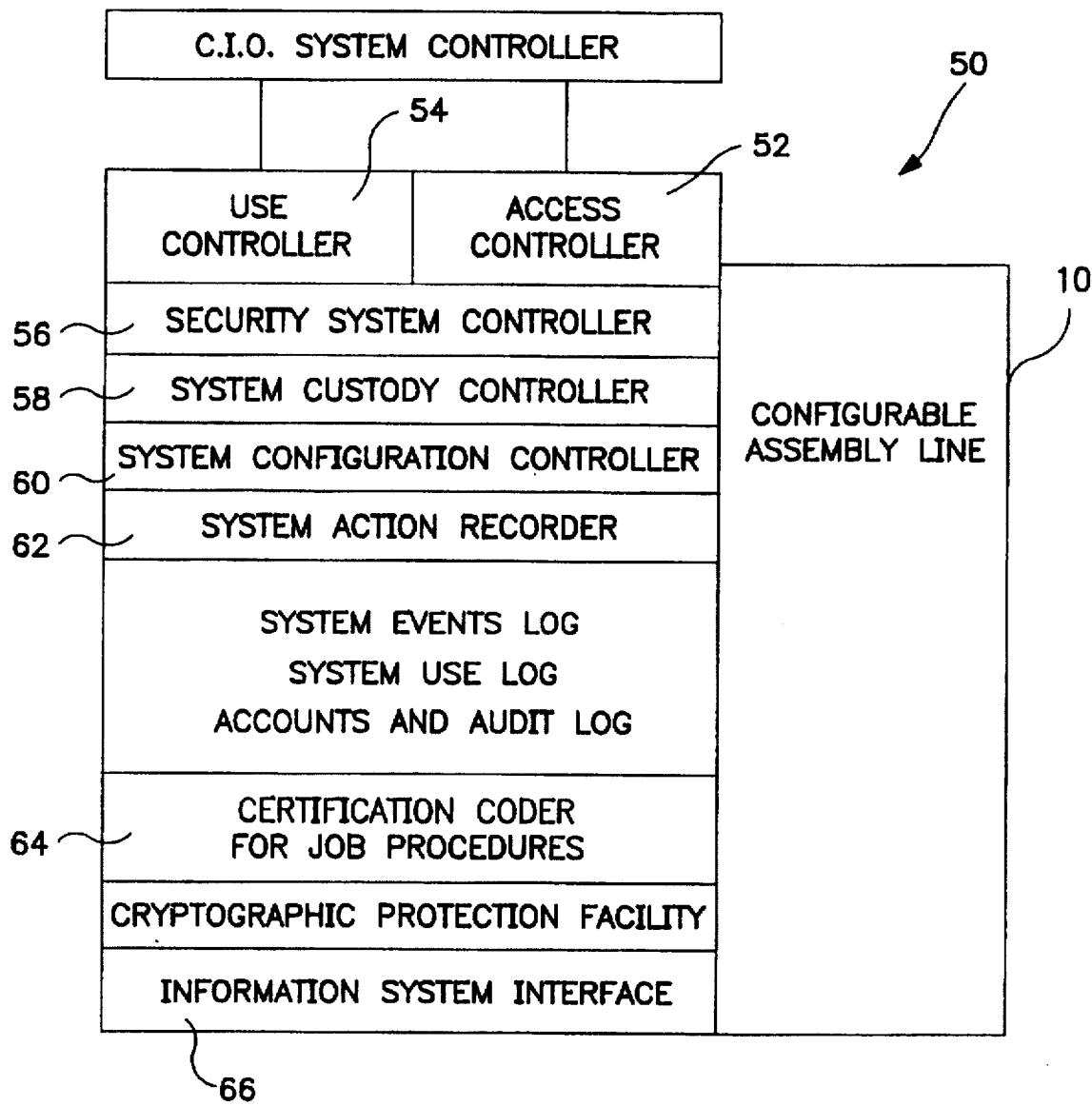
FIG. 2 is a schematic view of a system security module according to the present invention.

Referring now to FIG. 2, a security control facility 50 in accordance with the invention will be described. In accordance with the invention, security control facility 50 is preferably a physically separate and discrete structure except for a common communication means or bus, access to which is directly controlled by security control facility 50. Security control facility 50 preferably includes an access controller 52, a use controller 54, a security system controller 56, a system custody controller 58, a system configuration controller 60, a system action recorder or log facility 62, a certification coder 64, and an information system interface 66. In the preferred implementation, a validation facility such as a cryptographic check sum may be supplied.

In accordance with the invention, access controller 52 is configured to limit access of any particular user to system 10 under control of facility 50. This may be accomplished through requiring a password to be entered by a particular user, or by authorizing a particular work station for system access. Use controller 54 in accordance with the invention is provided so as to control use of an accessed system by the user. Thus, system use controller 54 is preferably configured to limit the use of system 10 to authorized sections thereof and to limit the extent of use such as time, application types, number of job iterations and the like. Security system controller 56 is preferably provided to monitor and control the integrity of information on system 10 under control of facility 50. System custody controller 58 is preferably configured to monitor the physical integrity or custody of the system against physical tampering and the like. System configuration controller 60 is preferably included in facility 50 to control the configuration of hardware and information resources. System action recorder 62 is preferably included in facility 50 and configured to monitor system events, system use and accounts and to generate system events logs, system use logs and accounts and audit logs for review by the user of facility 50. Certification coder 64 of facility 50 is provided advantageously to check the authentication code of any application process to be run on system 10 and when authorized by a system manager, attaches a code to such an application process which certifies that the check for authentication code was made. Information system interface 66 as set forth above provides a physical interface for communicating with an information storage system.

In accordance with the invention, the system control facility 50 is physically separate and discrete from all user portions of the ALPS/I system, particularly user processor systems 10. Further, the logs prepared by system action recorder 62, as well as all data to be stored, are preferably stored on write once, read only, permanent storage medium whereby an audit of all system logs is readily available.

As with other elements of the ALPS/I system according to the invention, the various controllers of facility 50 are preferably provided as modular processor elements controlled by firmware or hardware so as to prevent alteration of the operation of facility 50.

Figure 3:
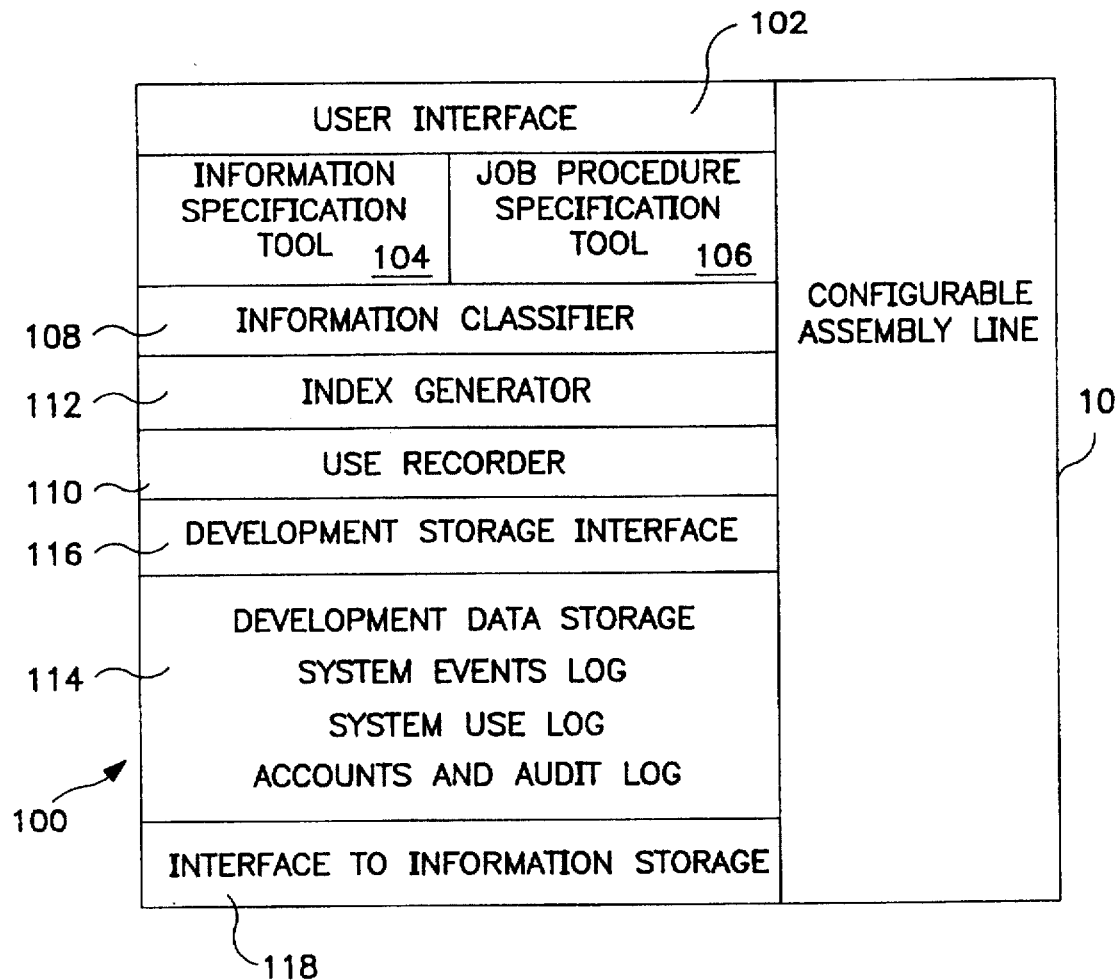
FIG. 3 is a schematic view of an application development facility according to the invention.

Referring now to FIG. 3, the ALPS/I system according to the present invention preferably further includes an application development facility 100 for developing application processes to be stored in information storage and executed by processor systems 10. In accordance with the invention, application development facility 100 is used by an authorized application developer to prepare application processes having the requisite process specification including data input requirements, data output requirements, and process functions all having sufficient specifications to ensure accountability, and also to generate a process network structure for each application process. In accordance with the invention, application development facility 100 preferably includes a user interface 102, an information specification tool 104, a job or application procedure specification tool 106, an information classifier 108, a use recorder 110, and an index generator 112.

In accordance with the invention, information specification tool 104 serves to ensure that all information input during the course of development of an application has proper specifications. In this regard, a file of application terms is maintained by facility 100, and any terms attempted to be entered through information specification tool 104 must either be defined by existing application terms, or new application terms sufficient to define a piece of information must be entered. Application procedure specification tool 106 is used according to the invention to enter process functions, also in application terms recognized by facility 100, and to ensure that applications being developed require proper input specifications and co-values, and carry these specifications and co-values forward to output prepared by a particular application. Information classifier 108 according to the invention serves to construct a logical classification system for particular grouping of information being entered through facility 100. Use recorder 110 serves to cooperate with security facility 50 to provide a log corresponding to the development of a particular application. Index generator 112 serves to generate an index for the data or information structures specified for use by development data storage facility 114. The application controller of an associated CAL 10 serves to analyze the application specification, to assign process element requirements, and to provide parameters to the process elements for establishing a specified network structure.

In further accordance with the invention, development facility 100 further includes development data storage area 114 mentioned above, which is physically separate and discrete from any other storage area, and a development storage interface 116 for accessing development storage 114. The provision of a physically separate storage member 114 is advantageous in accordance with the invention as applications under development are stored in an area physically and logically separate and discrete from main storage and inaccessible to users of processor system 10, thereby precluding the accidental or otherwise use of an application before it is thoroughly tested for compliance with system specifications. Development data storage 114 is preferably configured to store an events log for facility 100, as well as a systems use log and accounts and audit log which may be maintained separately at facility 100, and/or provided to security control facility 50.

Finally, facility 100 also preferably includes an interface to information storage 118 which is preferably limited so as to ensure against entry of any information whatsoever from an application under development. Interface to information storage 118 is nevertheless provided so as to provide read only access to data in the general information storage area, if needed.

Figure 4:
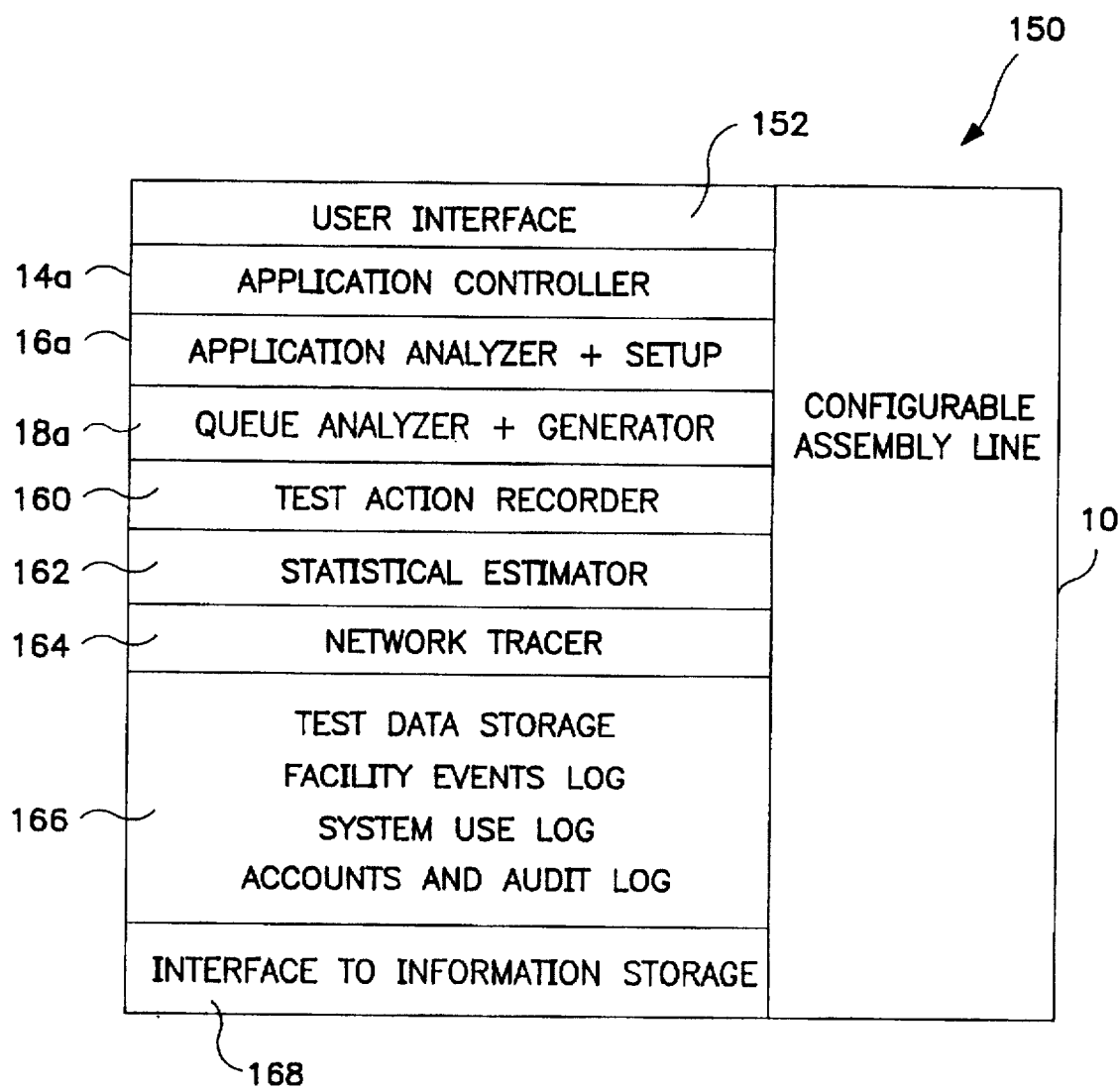
FIG. 4 is a schematic view of an application test facility according to the invention.

Referring now to FIG. 4, an application test facility 150 is also provided for testing applications developed at facility 100. As with other components of the ALPS/I system, application test facility 150 preferably includes a CAL processor 10 which includes an application controller 14a, an application analyzer and setup facility 16a, and a queue analyzer and generator facility 18a for use in testing applications under development. These elements are shown separately in FIG. 4 for the sake of illustration but could also be incorporated into CAL processor 10 in accordance with the invention. Facility 150 also includes a user interface 152, a test action recorder 160, a statistical estimator 162 and a network tracer 164.

Test action recorder 160 serves to record all steps and actions taken during the testing of a particular application for future audit, if necessary. Statistical estimator 162 uses reliability and accuracy information from data input and process function specifications to calculate reliability and accuracy data for the data output provided from the applications being tested. Network tracer 164 serves to trace all existing paths through the logic of a particular application under test, to verify that the logic of the application conforms to specification.

In further accordance with the invention, facility 150 preferably includes a test data storage area 166 for storing information relative to the testing procedure, again in a physically and logically separate and discrete area with respect to the main system information area. Test data storage area 166 preferably includes storage areas for a facility events log, a system use log, and an accounts and audit log which, as with facility 100, may also desirably be forwarded to security control facility 50. Finally, facility 150 also preferably includes a read only interface 168 to the main information storage area.

Figure 5:
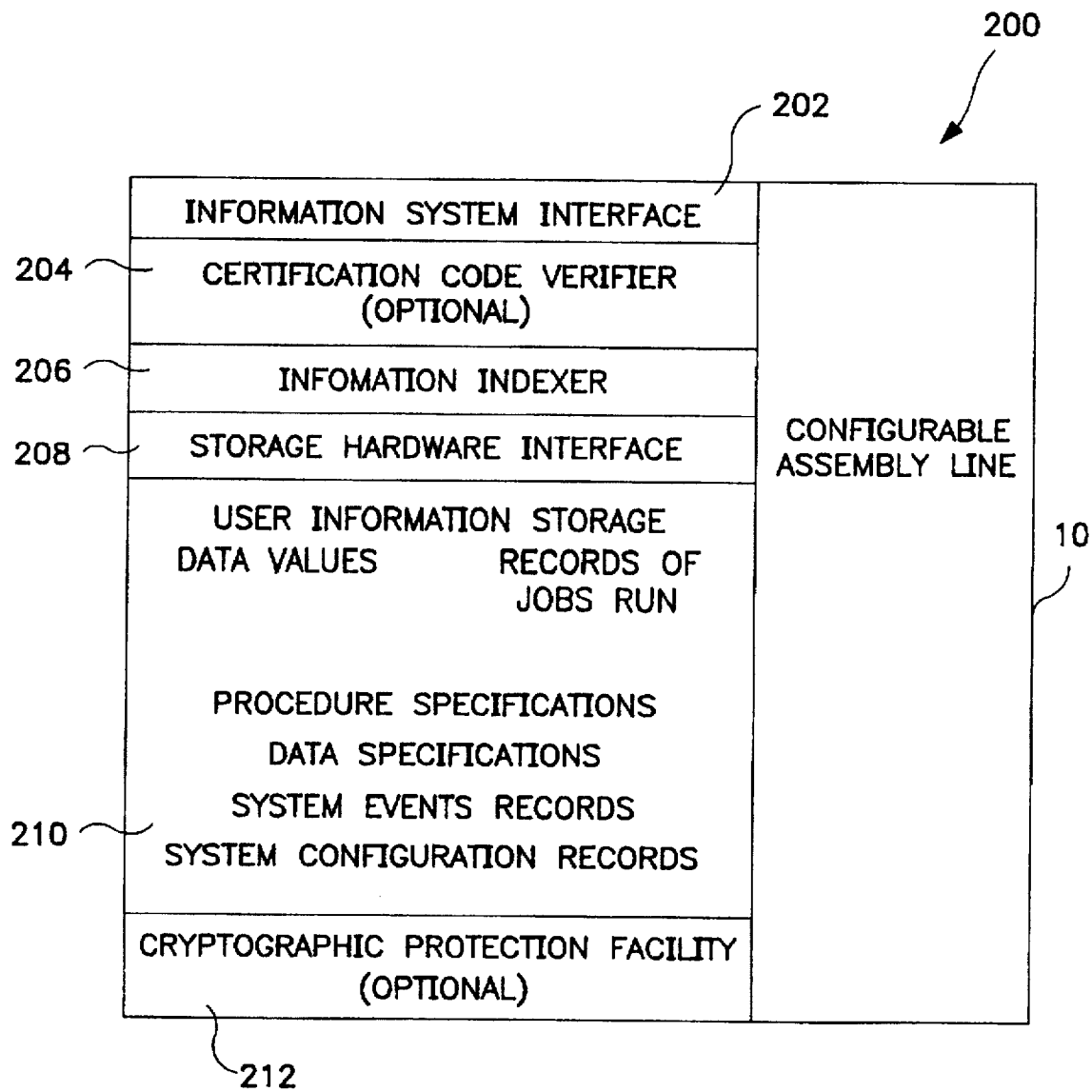
FIG. 5 is a schematic view of an information storage facility according to the invention.

Referring to FIG. 5, an information storage facility 200 in accordance with the invention will be described. Information storage facility 200 preferably includes an information system interface 202, which may preferably be connected, for example through data and control communications 22 or the like, to interface 24, interface 66, interface 118 and interface 168 to provide communication as needed between the various facilities of the ALPS/I system according to the invention. Information storage facility 200 preferably also includes a certification code verifier 204, an information indexer 206, a storage hardware interface and controller 208, and a main user information storage area 210. In accordance with the invention, certification code verifier 204 is preferably provided so as to check incoming data for proper co-values, including identifier, date/time information, certification codes, and preferably, validation cryptographic or other check code. In this regard, a cryptographic protection facility 212 may also be provided for this purpose.

Information indexer 206 serves to generate indexes from information provided by the information specification of a particular application process, as prepared by development facility 100, so as to provide a logical index structure of relevant information, either data or application process functions, to be stored in storage area 210. Interface 208 serves to place requested data on bus 22 for delivery to a proper data input queue, and to receive data via bus 22 from data output queues for storage in information storage area 210.

In accordance with a main feature of the present invention, information storage area 210 is provided as a number of configurable modules or elements, in a similar manner to elements 20 and the underlying wafers or elements which implement the various other components of the ALPS/I system. This is advantageous in that information storage area 210 according to the invention is readily expandable with minimal cost. Thus, in accordance with the present invention, main information storage area 210 is not treated as a resource which must be conserved. Accordingly, and advantageously, when data input is provided to a data input queue, only copies of such data input are provided. Thus, the data input remains in place in information storage area 210. Further, when data output is received, it is stored in a write once, read only location, and is never written over. When a particular storage area module is full of information, it is archived and replaced by a new storage area module. In this manner, all information used and prepared by the ALPS/I system according to the invention is retained and readily verifiable to conform to specification including accuracy and reliability.

Due to the dynamics of the ALPS/I system, data is never "read" locked (and is always "write" locked as set forth above) and is therefore available for use at all times thereby speeding operation as desired. When a new version of a piece of data is being generated, the preceding version of the data remains available for processing, although processes using the preceding version of data carry forward the time instance of same.

Within information storage area 210, specifications, data values, and text are stored having a logical structure in logically separate and discrete locations so as to preclude commingling therebetween and to thereby enhance reliability and accountability of the ALPS/I system and information products thereof. User classifications and indexing are preferably provided with a logical structure having user name/identification, class and subclass, and values. Class determination is accomplished by assigning attributes, and indexing is accomplished by classification identification and instance information which includes date, time and authority.

Referring to FIGS. 2–5, it should be noted that a CAL processor 10 is shown positioned with respect to each of security control facility 50, application develop facility 100, application test facility 150 and information storage facility 200. In accordance with the invention, each CAL processor 10 preferably includes a number of processing elements 20 which are configured so as to provide the required functions of components of the particular facility, such as, for example, elements 52, 54, 56, 58, 60, 62, 64 and 66 of security control facility 50 as set forth above, as well as the various components or elements of application development facility 100, application test facility 150, and information storage facility 200.

Figure 6:
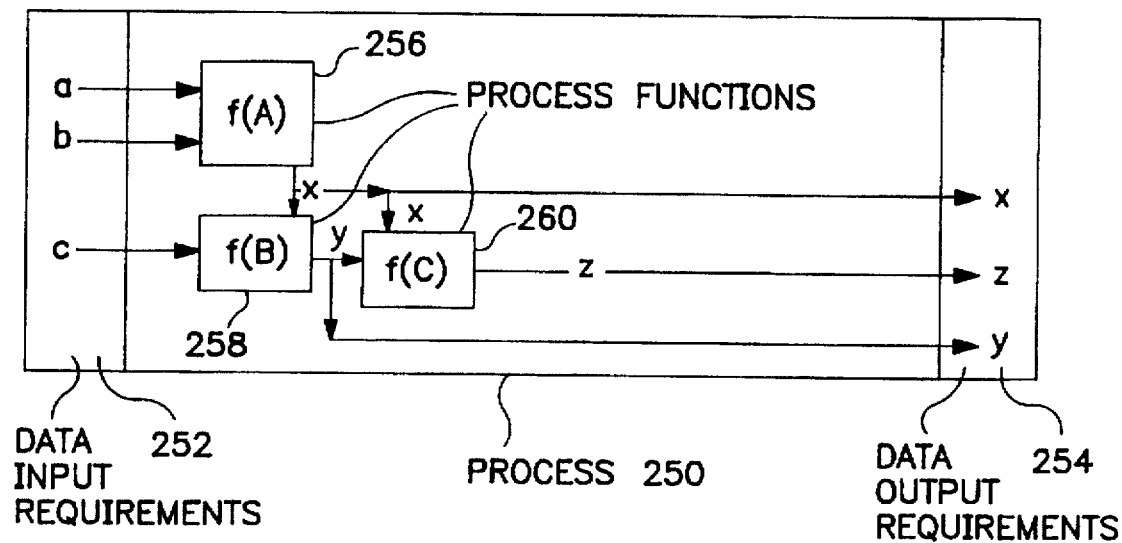
FIG. 6 schematically illustrates the structure of an application process according to the invention.
Figure 7:
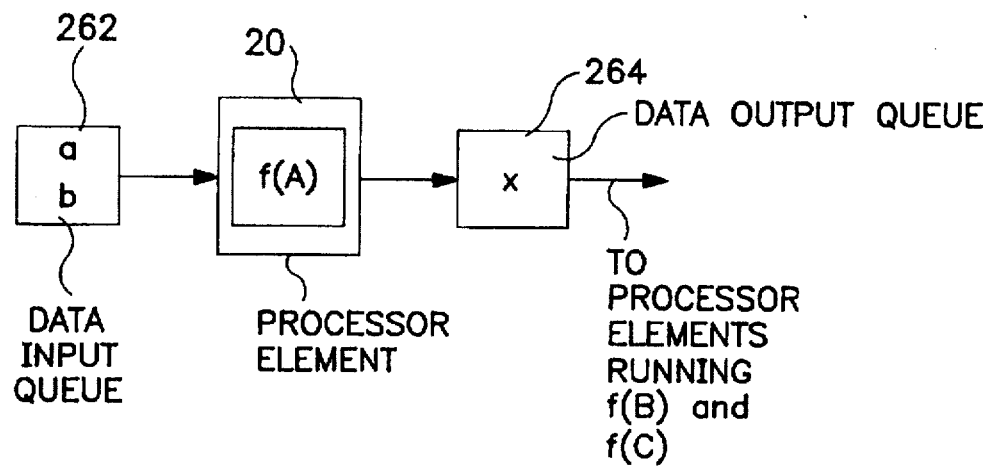
FIG. 7 schematically illustrates the execution of a process function at a processing element according to the invention.
Figure 8:
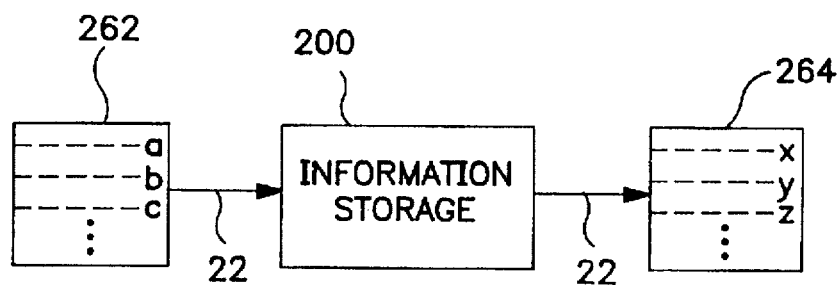
FIG. 8 schematically illustrates an information storage facility according to the invention with data input and data output queues.

Referring now to FIGS. 6–8, the actual strategy and steps behind executing processes in accordance with the present invention will be further described. FIG. 6 is a schematic illustration of a particular process 250 according to the invention, which includes a specification of data input requirements 252, data output requirements 254, process functions 256, 258, 260 and actual data input a, b and c, data output x, y and z, and process functions f(A), f(B) and f(C). When execution of process 250 is to begin, the specification of process 250 is analyzed to determine the data input requirements 252 and data output requirements 254 thereof. Responsive to controller 14, queue analyzer and generator facility 18 builds appropriate queues and signals information storage facility 200 to prepare copies of specified data for the queues, for example copies of data input a, b and c. Further, application analyzer and setup facility reads the process specification and breaks process 250 into process functions 256, 258 and 260 and assigns each process function to one or more processor elements 20, along with information regarding the process network structure, especially information with respect to predecessor and successor processor elements 20 with respect to a particular element 20, which network structure is preferably included with specification of process 250. Referring to FIG. 6, a single processor element 20 is illustrated performing process function f(A), which particular function requires data input a, b and creates data output x. As shown, processor element 20 receives data input a, b from a data input queue 262 at queue analyzer and generator facility 18, executes process function f(A) using data input a and b, and generates data output x which is forwarded to data output queue 264.

In accordance with the invention, assuming data output x is not needed for further process functions and complies with the required co-values and specification and is therefore in true "object" form, data output x would be transferred from output queue 264 through bus 22 and stored in information storage area 210, along with information as to the processor element 20 which created data output x, the data input a, b which was used, and any other information necessary to ensure the full accountability of data output x. In the example illustrated in FIGS. 6–8, data output x is further required in order to perform process functions f(B) and f(C) as shown in FIG. 6. Thus, data output x in this example is placed in a data input queue (not shown) configured to receive data output x, to be forwarded to a successor processor element 20 executing process function f(B) and f(C) according to the process network structure.

FIG. 8 schematically illustrates information storage facility 200 connected by bus 22 to a plurality of data input queues 262 and data output queues 264 for providing and receiving input and output data respectively.

In accordance with the invention, application processes may be developed and provided for execution wherein the process network structure calls for a plurality of successor processing elements 20 to be associated with a particular active processing element. Of course, the branches to each successor processing element may be alternative branches, with the output of the active processing element determining which successor element is to execute its assigned process function. In accordance with the invention, execution of such alternative branching of the process network structure is facilitated by providing data input as required for each potential successor processing element which may be selected for execution of a subsequent process function dependant upon the outcome of a currently executed process function. Still further in accordance with the invention, it is preferable that each processing element 20 of a particular network structure be configured so as to forward data output to the proper subsequent processing element, and to forward no-operation output or signals to all remaining associated subsequent processing elements so that only the desired processing element executes and generates a further data output.

Returning to FIG. 1, it should be appreciated that processor system 10 is configured in accordance with the present invention to execute a plurality of processes substantially simultaneously, synchronously or concurrently. Of course, several synchronously executed processes may require execution of the same process function, identical data input, or identical data output. Preferably, the second or duplicate process function, data input or data output is provided at, to or from a different, discrete processor element 20. Alternatively, identical process functions may be assigned to the same element or elements 20 for processing, and data input queues may be generated for providing data input to elements 20 assigned to several different process functions, while data output queues may be generated for receiving data output from several different process functions, all within the scope of the present invention.

In accordance with the invention, it should be readily apparent that a processor system and method have been provided for executing application processes so as to provide information and other products in an assembly line manner subject to accountability, accuracy and reliability verification similar to current industrial manufacturing processes. The presently disclosed processor system and method thereby represent a significant advance in provision of security, reliability and accuracy of information thereby responding to a long-felt need in the industry.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A processor system for executing a process, comprising:

a plurality of discrete processing elements;

information storage means for storing data;

means for generating queues for delivering and receiving data;

control means for controlling execution of said process and for managing said plurality of discrete processing elements; and means for communicating said plurality of discrete processing elements, said information storage means, said means for generating queues, and said control means;

wherein said control means comprises:
  i) application setup means for reading said process and identifying a number of process functions of said process, and for assigning said number of process functions to a number of discrete processing elements of said plurality of discrete processing elements;
  ii) data queue assembly means for extracting data input and data output requirements from said process and signalling said means for generating queues to generate queues to deliver said data input requirements and to receive said data output requirements; and
  iii) wherein each of said processing elements, said information storage means, said means for generating queues, said control means and said process has a specification including at least a reliability factor, an accuracy factor and an account identifying instance of use.

2. A processor system according to claim 1, wherein said application setup means is implemented in hardware.

3. A processor system according to claim 1, wherein said data queue analyzing means is implemented in hardware.

4. A processor system according to claim 1, wherein at least two of said plurality of discrete processing elements, said information storage means, said means for generating queues, and said control means are implemented logically discretely from each other.

5. A processor system according to claim 1, wherein each of said plurality of discrete processing elements, said information storage means, said means for generating queues, and said control means are implemented logically discretely from each other.

6. A processor system according to claim 1, wherein said application setup means further comprises means for determining data input requirements for a process function of said number of process functions, and means for providing said data input requirements for said process function to a processing element of said plurality of processing elements to which said process function has been assigned.

7. A processor system according to claim 1, wherein said process includes a process network structure, and wherein said control means further comprises means for determining said process network structure of said process, said process network structure comprising identification and logical location of processing elements and generated queues which are assigned to said process, and means for providing a network of said processing elements corresponding to said process network structure.

8. A processor system according to claim 7, wherein said network of said processing elements includes predecessor and successor processing elements for each processing element of said network, and wherein said processing elements have registers for storing port identifications and logical locations of said predecessor and successor processing elements, for storing a copy of a last input received from said port identifications and logical locations of said predecessor processing elements, and for storing a copy of a last output sent to said port identifications and logical locations of said successor processing elements, and wherein said processing elements each further include a register which receives and retains an identity of a current assigned process function.

9. A processor system according to claim 1, further comprising means associated with said information storage means for checking data of said data output requirements for proper data co-values.

10. A processor system according to claim 9, wherein said information storage means stores said data input requirements each having data co-values and a specification.

11. A processor system according to claim 10, wherein said data co-values include an identifier, an authentication code, and a validation code.

12. A processor system according to claim 10, wherein said specification includes reliability and accuracy of said data input requirements.

13. A processor system according to claim 1, wherein said plurality of discrete processing elements each have a status which comprises (1) assigned status wherein said processing element is assigned to a process function, (2) ready status wherein said processing element is ready to be assigned to a process function, and (3) inoperable status wherein said processing element is inoperable, and wherein said discrete processing elements further comprise means for sending said status to said control means, and wherein said control means is programmed to assign process functions to processing elements having said ready status, and is programmed to bypass processing elements which have said assigned status and said inoperable status and to signal said processing elements to return to said ready status.

14. A processor system according to claim 13, wherein said control means further comprises means for maintaining a current inventory of said processing elements, said inventory including said status of said processing elements.

15. A processor system according to claim 14, wherein said control means further comprises means for ending said process and for restoring processing elements assigned to said process to said ready status.

16. A processor system according to claim 1, wherein said processing elements each comprise:
means for sending a ready for data signal to a source of data input indicating readiness to receive data;
means for sending copies of data output to a receiver of data output upon receiving a ready for data signal; and
means for retaining copies of data input and data output until new data input is received and new data output is generated.

17. An apparatus according to claim 1, further comprising system control means associated with said means for communicating for monitoring use of said apparatus.

18. An apparatus according to claim 17, wherein said system control means comprises means for controlling access of users to said apparatus.

19. An apparatus according to claim 17, wherein said system control means comprises means for controlling use of said apparatus by users.

20. An apparatus according to claim 17, wherein said system control means comprises means for monitoring custody of said apparatus.

21. An apparatus according to claim 17, wherein said system control means comprises means for controlling configuration of said apparatus.

22. An apparatus according to claim 17, further comprising activity recorder means, associated with said means for communicating, for recording activity on said apparatus.

23. An apparatus according to claim 1, wherein said information storage means stores at least one process to be executed, and said at least one process includes a process specification including said data input requirements and said data output requirements.

24. An apparatus according to claim 23, wherein said process specification further includes system resource requirements for said process.

25. An apparatus according to claim 24, wherein said process specification further includes said process network structure.

26. An apparatus according to claim 24, wherein said information storage means stores a plurality of processes each having said process specification, and wherein said control means further comprises means for evaluating said process specification for each process waiting to be executed, and for executing processes having process specifications within available system resources.

27. A method for executing a process, comprising the steps of:
reading said process so as to identify specified process functions, specified data input requirements and specified data output requirements of said process;
assigning said process functions to a plurality of discrete processing elements for generating said data output requirements from said process functions and said data input requirements;
generating queues at an information storage system containing said data input requirements to deliver copies of said data input requirements to said plurality of discrete processing elements, and to receive copies of said data output requirements from said plurality of discrete processing elements; and
wherein each of said processing elements, said information storage means, said means for generating queues, said control means and said process has a specification including at least a reliability factor and an accuracy factor and an account identifying instances of use.

28. A method according to claim 27, further comprising the step of providing processing means for carrying out said analyzing, assigning and generating steps, and implementing said processing means under user inaccessible hardware.

29. A method according to claim 27, wherein said analyzing step further comprises the steps of:
extracting a process network structure comprising identifications and locations of processing elements and information storage elements of said information storage means which are assigned to said process function; and
providing a network of said processing elements assigned to said process corresponding to said process network structure.

30. A method according to claim 29, wherein said network structure includes an active processing element executing a current process function and a plurality of successor processing elements associated with said active processing element for executing a subsequent process function, further comprising the steps of delivering data input requirements for said subsequent process function to each of said plurality of successor processing elements, and selecting at least one of said successor processing elements to execute said subsequent process function dependant upon results of execution of said current process function.

31. A method according to claim 30, wherein said active processing element sends data output to said at least one of said successor processing elements, and sends no-operation output to remaining successor processing elements, whereby only said at least one of said successor processing elements executes said subsequent process function.

32. A method according to claim 27, further comprising the steps of:

providing data input requirements stored in said information storage means with data input co-values;

executing said process function so as to provide data output having data output co-values;

checking said data output from said processing elements for data output co-values; and requiring said data output to have said data output co-values before said data output is stored in said information storage means, whereby results of said process function are certifiably correct.

33. A method according to claim 32, wherein said data input co-values and said data output co-values comprise an identifier and an authentication code.

34. A method according to claim 33, wherein said data input co-values further comprise a validation code.

35. A method according to claim 32, further comprising the steps of providing said data input requirements with a specification including reliability and accuracy of said data input requirements;

executing said process function so as to provide said data output having a data output specification;

checking said data output for said data output specification; and requiring said data output to have said data output specification before said data output is stored in said information storage means.

36. A method according to claim 27, further comprising the step of retaining copies of data input and data output at said plurality of processing elements until new data input is received and new data output is generated.

37. A method according to claim 27, further comprising the steps of maintaining copies in said information storage means of all data input and all data output, whereby execution and results of said process are readily audited.

38. A method according to claim 27, further comprising the step of executing a plurality of processes substantially concurrently, and wherein said step of generating queues includes generating queues for said data input requirements and said data output requirements for each of said plurality of processes being executed, whereby queues are provided having said data input requirements and said data output requirements for said plurality of processes being executed.

39. A processor system for executing a process specified as a network structure including data requirement specifications, comprising:

a plurality of discrete processing elements;

information storage means for storing data wherein each element of data has a specification and a data co-value identifying said specification;

means for assembling queues for delivering and receiving data specified in said data requirement specifications;

means for setting up and monitoring execution of said process and for managing said plurality of discrete processing elements;

means for communicating said plurality of discrete processing elements, said information storage means, said means for generating queues, and said control means;

wherein said means for setting up comprises:

i) application setup means for reading said specification of said process and identifying a number of process functions of said process, and for assigning said number of process functions to a number of discrete processing elements of said plurality of discrete processing elements;

ii) data queue requirement analyzing means for reading data input and data output requirements stated in said process specification and signalling said means for assembling queues to assemble queues to deliver said data input requirements and to receive said data output requirements;

iii) means for assigning a specification and co-value identifying said specification to data output from said process; and iv) means associated with said information storage means for checking said data output from said process for said specification and said co-value identifying said specification.

40. A processor system for executing a process having a network structure including data requirement specifications, comprising:

a plurality of discrete processing elements;

information storage means for storing data wherein each element of data has a specification and a data co-value identifying said specification;

means for generating queues for delivering and receiving data specified in said data requirement specifications;

control means for controlling execution of said process and for managing said plurality of discrete processing elements;

means for communicating said plurality of discrete processing elements, said information storage means, said means for generating queues, and said control means;

wherein said control means comprises:

i) application setup means for analyzing said process and separating said process into a number of process functions, and for assigning said number of process functions to a number of discrete processing elements of said plurality of discrete processing elements;

ii) data queue analyzing means for extracting data input and data output requirements from said process and signalling said means for generating queues to generate queues to deliver said data input requirements and to receive said data output requirements; and iii) means for providing copies of data from said information storage means corresponding to said data input requirements at said queues to deliver said data input requirements whereby all data corresponding to said data requirements of said process can be prefetched.

41. A process system according to claim 1, wherein said plurality of discrete processing elements are capable of performing a plurality of process functions, and wherein said application setup means selects a set of at least one of said discrete processing elements and connects said set to perform specified process functions of said plurality of process functions so as to execute said process.

* * * * *